June 9, 1953  B. J. SCHILL  2,641,510
WHEEL SUSPENSION
Filed June 2, 1947  2 Sheets-Sheet 1

Inventor:
Bernard J. Schill,
By Soans, Pond & Anderson
Attys.

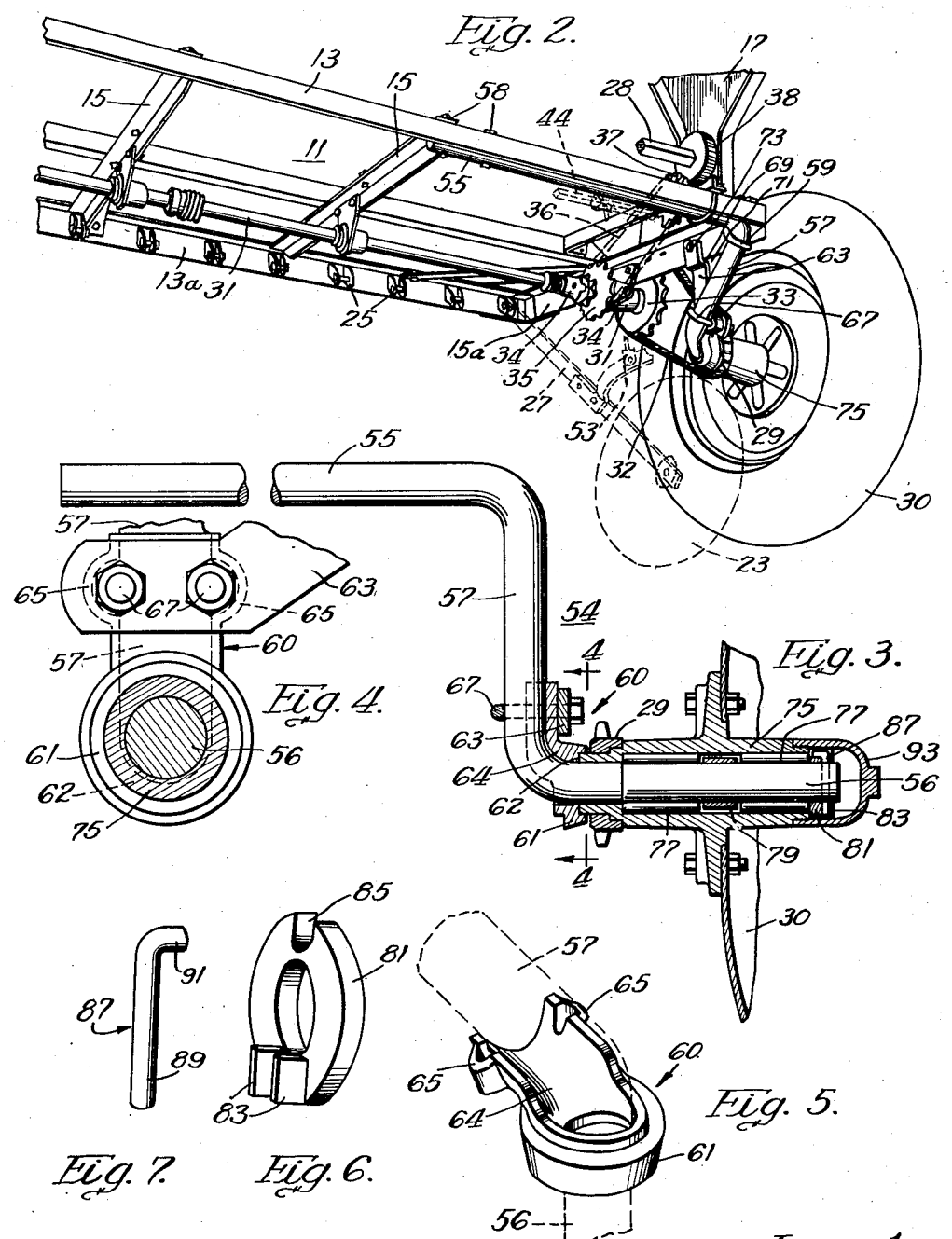

Patented June 9, 1953

2,641,510

UNITED STATES PATENT OFFICE 2,641,510

WHEEL SUSPENSION

Bernard J. Schill, Rockford, Ill., assignor to J. I. Case Company, Racine, Wis., a corporation of Wisconsin Application June 2, 1947, Serial No. 751,714

3 Claims. (Cl. 301—125)

1

The present invention relates to grain drills and, in particular, to an improved wheel suspension and frame construction which provides unimpeded clearance between the surface of the ground and the frame of the implement.

In the past, grain drills were provided with relatively high wheels in order to dispose the frame and the drive mechanism of the implement high enough above the ground level to allow the installation of furrow openers and other seeding apparatus between the frame and the ground level. This construction allowed the grain to run by gravity from a hopper supported upon the frame into the seeding mechanism. Large diameter support wheels as have been used in the prior art machines have, however, a most serious disadvantage. Their size renders impractical the use of pneumatic tires with their inherent advantages of reducing vibrations and of allowing relatively high speed movement over roads.

Various depending wheel suspensions have been proposed to provide the necessary clearance required for the use of small diameter pneumatic-tired wheels, but all of these arrangements have either materially weakened the frame of the implement or have been unduly expensive. The complicated grain metering mechanisms necessary to a grain drill, with their interrelated gear trains and long power transmission and control shafts, make it imperative that the frame structure be substantially rigid and resistant to torsional forces which might misalign the shafts. It is also essential in a grain drill structure that the supporting wheels shall be journaled in close proximity to the ends of the frame so as to minimize the width of the implement.

The object of the invention, therefore, is to provide an improved depending wheel suspension, an accessible drive mechanism arrangement, and a rigid frame construction for apparatus of the class described, which will overcome the disadvantages of the prior art structures. Other objects and advantages of the structure will be apparent upon reference to the following description and the accompanying drawings of one preferred embodiment thereof.

In the drawings,

Fig. 2 is a fragmentary, perspective view of the wheel suspension and frame illustrated in Fig. 1;

Fig. 3 is a fragmentary, sectional view taken on line 3—3 in Fig. 1;

2

Figure 1:
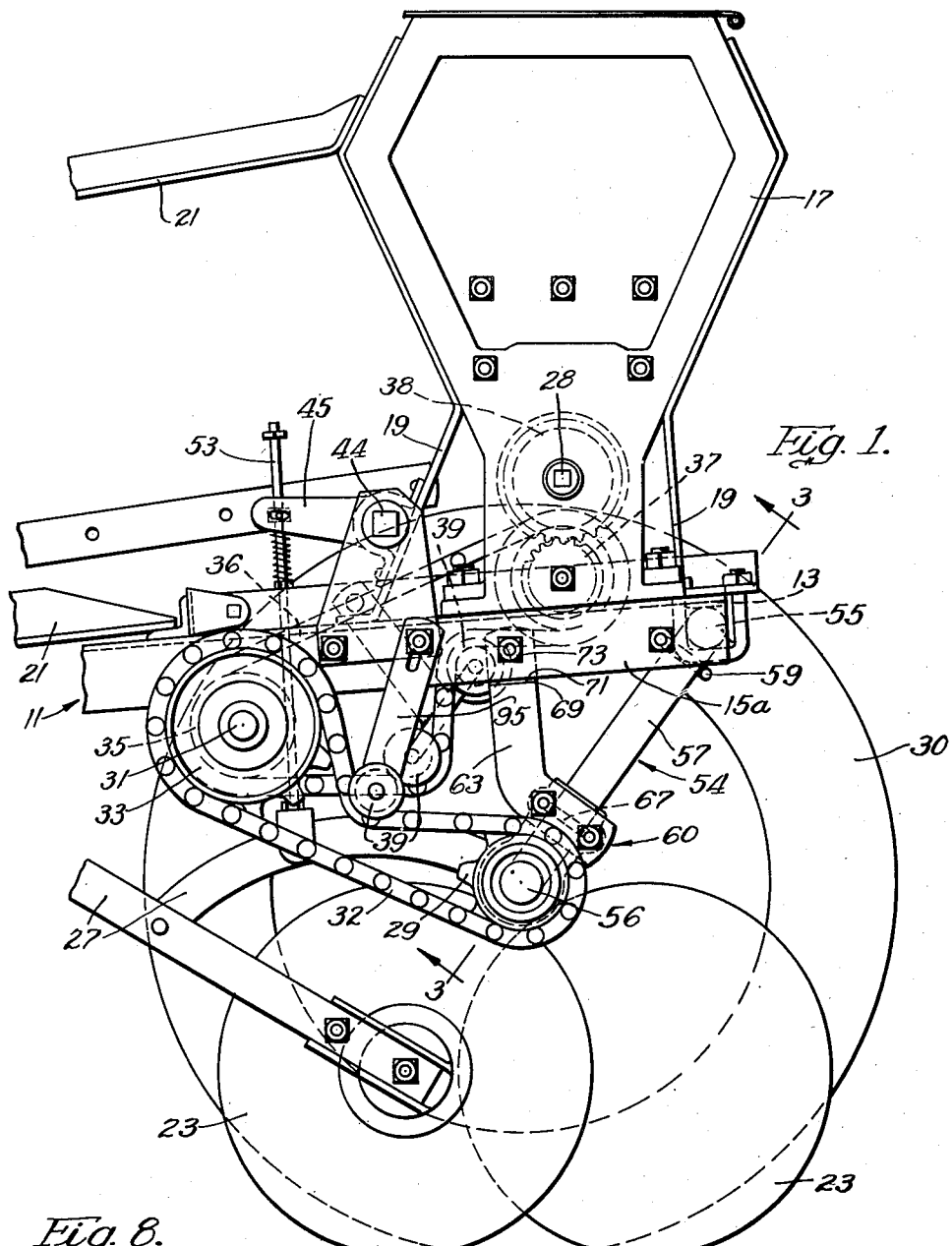
Fig. 1 is a fragmentary, side elevational view of a grain drill which is provided with a wheel suspension and frame embodying the features of the invention.
Figure 8:
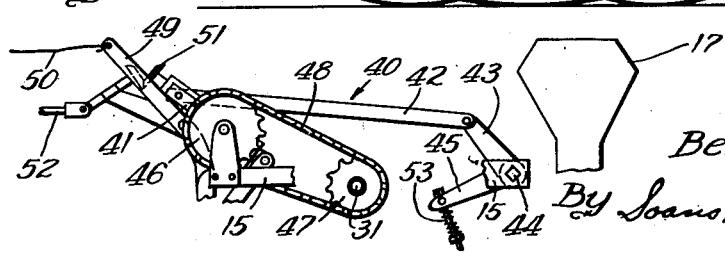

Fig. 4 is a sectional view taken on line 4—4 in Fig. 3;

Fig. 5 is a perspective view of a support bracket, which is one of the important features of the invention;

Fig. 6 is a perspective view of a thrust bearing member for use with the structure illustrated in the other figures;

Fig. 7 is a perspective view of a thrust bearing locking pin adapted for use with the thrust bearing illustrated in Fig. 6; and Fig. 8 is a fragmentary, elevational view of the furrow opener lifting mechanism which forms a part of the apparatus.

The illustrated structure comprises a frame 11 which includes a plurality of transverse frame members 13, conveniently, angle structural sections, which are connected by a plurality of short longitudinal stiffening members 15. A grain hopper 17 having closed ends, is supported above the frame 11 by suitable brackets 19 in the conventional manner so as to provide a receptacle for the grain which is to be seeded. A draw bar structure 21 is connected to the frame 11 and to the hopper 17 in order that the drill may be pulled along a field. A plurality of staggered furrow openers 23 are pivotally supported on brackets 25 attached to the forward transverse frame member 13a by suitable drag bars 27 as illustrated. Grain feed chutes (not shown) extend from the hopper 17 to a point adjacent the furrow openers 23 and are adapted to drop seeds into the furrow which is formed by the furrow opener. Suitable covering mechanism, such as drag chains or rollers (also not shown), is provided to cover the seeds after they are planted in the furrow.

The structure includes a seed metering arrangement (not shown) which is driven from a shaft 28 which extends across the implement. The shaft 28 is adapted to be driven by suitable means from sprockets 29 attached to the hubs of the supporting wheels 30. The sprockets 29, upon rotation of the wheels 30, drive a jack shaft 31 by means of chains 32 and sprockets 33. The jack shaft 31 is supported in bearings on the main frame 11 and is disposed forwardly of the grain bin 17 so as to allow free access to all the moving parts for repairs and maintenance. A sprocket 35 rotates on the end of the jack shaft 31 and is selectively connected to it by means of a spring clutch 34. A chain 36 connects the sprocket 35 to a combination sprocket and gear 37 supported at the end of the grain hopper 17. The gear section of the combination gear and sprocket 37 meshes with a gear 38 on the seeding shaft 28.

Suitable idlers and chain tighteners 39 are provided for the chains 32 and 36.

The inner end of the jack shaft 31 drives a conventional furrow opener lift mechanism 40 (Fig. 8). The furrow opener lift mechanism 40 is supported upon the frame members 15 and comprises an adjusting arm 41 connected by means of a link member 42 to a lever arm 43 on a square shaft 44, to which are attached a plurality of raising arms 45. The adjusting arm 41 is actuated by a cyclic clutch having an attached sprocket 46 which is operatively connected to the continuously rotating jack shaft 31 by means of a sprocket 47 and a chain 48. The cyclic clutch is actuated by means of a trip lever 49 which is connected to the draft vehicle by means of a rope 50. A set of bevel gears 51 modifies the movement of the adjusting arm 41 so that the depth of the furrow openers 23 may be varied. The bevel gears 51 are adjusted by means of the shaft 52 which extends to the draft vehicle.

When the clutch trip lever 49 is actuated by the rope 50 the clutch rotates a crank 180°, said crank being connected to the adjusting arm 41. The adjusting arm 41 rotates the square shaft 44 which rotates its attached raising arms 45. The raising arms 45 are connected to the furrow opener drag bars 27 by means of the usual rod and spring arrangements 53 which causes the furrow openers 23 to be biased into the soil when they are in the operating position.

Each end of the grain drill frame 11 is supported on a standard, small-sized, pneumatic-tired wheel 30 which is journaled onto a depending axle construction 54. This axle construction provides enough clearance between the frame 11 and the ground level for the installation of grain chutes and furrow openers 23 and facilitates the longitudinal spacing of the various drive elements in the manner heretofore described. This longitudinal spacing of the various drive elements is an important feature of the invention; it substantially reduces the overall vertical dimensions of the grain drill structure; it provides increased clearance between the operating elements to simplify the subsequent maintenance thereof; and it effects the distribution of the shock forces, which are produced in the operation of power transmission units of this type, to a plurality of the framework sections, thus producing a more rugged and durable grain drill unit. The longitudinal spacing of the operating elements also provides additional clearance between the hopper unit 17 and the ground level, the use of such arrangement in combination with the angled axle unit thus providing a maximum amount of clearance beneath the hopper unit to further simplify the mounting and subsequent maintenance of the grain chutes and furrow openers 23.

The axle construction 54 comprises a shaft having two spaced-apart, generally parallel, sections 55 and 56 which are joined by a connecting section 57. One of the parallel sections 55 is adapted to be connected to the rear transverse frame member 13 by means of bolts 58 or other suitable fastening means. The other section 56 provides a journal for the small-diameter, pneumatic-tired, support wheel 30. The journal or wheel supporting section 56 is disposed below and forwardly of the rear frame member 13, substantially as illustrated. The axle is connected to the outer longitudinal stiffening member 15a by means of a hook clamp 59, whose arcuate section encompasses the connecting section 57, and whose threaded shank is bolted into the stiffening member 15a. The connecting section 57 of the axle extends downwardly and lies substantially in the plane of the outer frame member 15a so as to minimize torsional forces on the frame. The angle at which the downwardly extending connecting section 57 is disposed determines the portion of shock that is absorbed by direct compression of the connecting section when the implement is being drawn over rough and uneven fields, and my experiments have shown that this angle should be within the range of from about 40 to 60 degrees.

A supporting bracket 60 comprises an integral casting, and is attached to the axle at the juncture of the wheel supporting section 56 of the shaft and the downwardly extending, connecting section 57 thereof. The bracket 60 performs four important functions. First, the outer face of the bracket 60 is provided with an annular flange 61 which serves as a sand cap for the wheel bearing. Second, the bracket 60 forms an annular bearing surface 62 adapted to absorb inward thrust from the wheel 30 during the operation of the implement. Third, the bracket 60 provides a connection for a bracing member 63 which extends upward to the outer stiffening member 15a; and, fourth, the annular portions 61 and 62 which provide the bearing surface and the sand cap serve to support the journal section 56 of the shaft.

The inner portion 64 of the bracket 60 is shaped to fit into the curve resulting from the bend between the downwardly extending section 57 and the journal section 56 of the axle. The upper or clamping portion of the bracket 60 has a pair of projecting ears 65 which are drilled with suitable holes and through which are passed the shanks of a U-bolt 67 or other connecting means which encompasses the downwardly extending section 57 of the shaft and attaches the bracket 60 thereto.

The bracing member 63 is a generally vertically extending flat steel strap which is drilled so as to be connected to the clamping portion of the bracket 60 and to the downwardly extending section of the shaft 57 by the threaded legs of the U-bolt 67 as illustrated. The upper end of the bracing member 63 is provided with a knee or offset section 69 which is adapted to engage the lower surface of the stiffening member 15a as illustrated at 71 in Fig. 2. The upper end of the bracing member 63 is attached to the frame member 15a by any convenient means, such as by a bolt 73, so that the weight of the implement is borne by the offset section 69 of the bracing member 63.

The wheel bearing means includes a hub or bearing section 75 which is larger than the journal section 56 so as to provide sufficient clearance for a pair of roller bearings, as illustrated at 77, or equivalent means. The roller bearings 77 are spaced by the usual spacing ring 79.

The outer thrust bearing means comprises a bearing ring 81 which has an annular bearing surface and whose cutout central portion is adapted to fit around the journal section 56 of the shaft. On the outer face of the thrust bearing ring, two ring-retaining projections 83 are provided and the portion of the annular ring 81 which is opposite these retaining projections 83 is provided with a recess 85. In assembling the bearing, the wheel 41 and its associated roller bearings 77 are placed on the shaft 47 and the flat surface of the bearing ring is engaged against the wheel hub or bearing section 75. An L-shaped locking pin 87 (Fig. 7) is placed through a hole in the journal section 56 provided therefor in a manner adapted to lock the long leg 89 of the L into the retaining projections 83 on the bearing ring 81 and to place the short leg 91 of the L in the recessed portion 85 of the bearing ring 81. A hub cap 93 is screwed onto the bearing section 75 of the wheel 30 as illustrated, to maintain the parts in their proper relation. Thus, the wheel 30 is provided with a thrust bearing at its inner end by action of the face 62 of the supporting bracket 60 and with a thrust bearing at the outer end by the provision of the bearing ring 81 and the locking pin 87.

The structure of the present invention provides a rigid support for the small diameter wheel and is capable of absorbing great shocks without buckling or unduly twisting the frame. As previously stated, the forwardly and downwardly extending section of the axle is compressed to resist the shocks created by a rough field, stones, etc., while the vertically extending bracing member 63 bears substantially all of the weight of the vehicle.

The arrangement of the sprockets and shafts made possible by the depending wheel construction allows free access to the various members for adjustment and repair and permits the lowering of the grain bin into close proximity with the main frame. The multiple purpose bracket at the juncture of the bracing member and the axle also provides added mechanical strength as well as providing a bearing surface and a sand cap for the wheel bearing.

The features of my invention that are believed to be new are expressly set forth in the appended claims.

I claim:

1. In combination in apparatus of the class described, a frame, a support wheel, and means for mounting said support wheel on said frame, said means including an offset shaft and a support bracket, said bracket being adapted to engage angularly-disposed sections of said offset shaft, and comprising an annular portion which is adapted to extend around one of said shaft sections and a clamping portion which is angularly disposed relative to said annular portion and which is adapted to receive the other shaft section, the outer face of said annular portion being provided with an annular recess or groove which is adapted to co-act with the hub of said support wheel so as to provide an abutment bearing surface which absorbs inward thrusts of said support wheel hub and being provided with an annular extension which co-acts with said hub to provide a sand cap, said clamping portion of said bracket having openings for receiving a clamping member for attaching said bracket to the shaft section adjacent said clamping portion, and said clamping portion having means for rigidly interconnecting same with said frame.

2. In combination in apparatus of the class described, a frame, a support wheel, means for mounting said support wheel on said frame, said means including an offset shaft and a supporting bracket, said bracket being adapted to engage angularly disposed sections of said offset shaft, and comprising an annular portion which is adapted to extend around one of said shaft sections and a clamping portion which is angularly disposed relative to said annular portion and which is adapted to receive the other shaft section, the outer face of said annular portion being provided with an annular recess or groove which is adapted to co-act with the hub of said support wheel so as to provide an abutment bearing surface which absorbs inward thrusts of said support wheel hub, means engaging said clamping portion and said shaft section adjacent thereto for rigidly interconnecting said clamping portion and said shaft section and means engaging said clamping portion and said frame for rigidly interconnecting said clamping portion and said frame.

3. The apparatus set forth in claim 2 characterized in that said means engaging said clamping portion and said frame, engage said clamping portion and said frame at points which are in substantial vertical alignment with the portion of said offset shaft about which the annular portion of said supporting bracket extends.

BERNARD J. SCHILL.

References Cited in the file of this patent

UNITED STATES PATENTS

| Number | Name | Date |
|---|---|---|
| 452,376 | Holley | May 19, 1891 |
| 645,509 | Morden | Mar. 13, 1900 |
| 819,302 | Munsing | May 1, 1906 |
| 1,019,345 | Needham | Mar. 5, 1912 |
| 1,292,771 | Heider | Jan. 28, 1919 |
| 1,312,748 | Rauch | Aug. 12, 1919 |
| 1,363,978 | Huckabee | Dec. 28, 1920 |
| 1,476,728 | Roby | Dec. 11, 1923 |
| 1,624,022 | Strecker | Apr. 12, 1927 |
| 1,656,831 | Rohlfsen | Jan. 17, 1928 |
| 1,725,918 | Henderson | Aug. 27, 1929 |
| 1,901,298 | Johnson | Mar. 14, 1933 |
| 2,041,616 | Noell | May 19, 1936 |
| 2,234,923 | Geraldson | Mar. 11, 1941 |
| 2,387,504 | Farr | Oct. 23, 1945 |
| 2,391,973 | Hyland | Jan. 1, 1946 |
| 2,498,606 | Hyland | Feb. 21, 1950 |